United States Patent [19]

Schneider

[11] 4,097,629

[45] Jun. 27, 1978

[54] PROCESS AND APPARATUS FOR THE PRODUCTION OF LAMINATED SHEETS

[76] Inventor: Walter Schneider, 54 Wildenbühlstrasse, Langnau am Albis, Switzerland

[21] Appl. No.: 768,028

[22] Filed: Feb. 14, 1977

[30] Foreign Application Priority Data

Feb. 24, 1976 Switzerland .......................... 2223/76

[51] Int. Cl.² .............................................. B32B 3/00
[52] U.S. Cl. ...................................... 428/71; 156/291; 156/311; 156/359; 156/497; 156/498; 428/76; 428/195; 428/322
[58] Field of Search ................ 156/282, 291, 447, 498, 156/79, 78, 311, 359; 428/71, 76, 201, 195, 310, 311, 315, 322

[56] References Cited

U.S. PATENT DOCUMENTS

| | | | |
|---|---|---|---|
| 3,318,744 | 5/1967 | Hurley | 156/497 |
| 3,573,145 | 3/1971 | Witkosky et al. | 428/76 |
| 3,635,784 | 1/1972 | Snitker | 428/310 |
| 3,716,434 | 2/1973 | Cook et al. | 156/291 |
| 3,746,604 | 7/1973 | Reynolds | 428/311 |

*Primary Examiner*—Edward G. Whitby
*Attorney, Agent, or Firm*—William Anthony Drucker

[57] ABSTRACT

A process and apparatus for making laminated sheets in which a fusion adhesive is applied to both sides of a sheet core, the melting point of the adhesive being below the conversion point of the sheet core, the core being provided with covering sheets, heated to the melting point of the adhesive, moulded and cooled.

9 Claims, 8 Drawing Figures

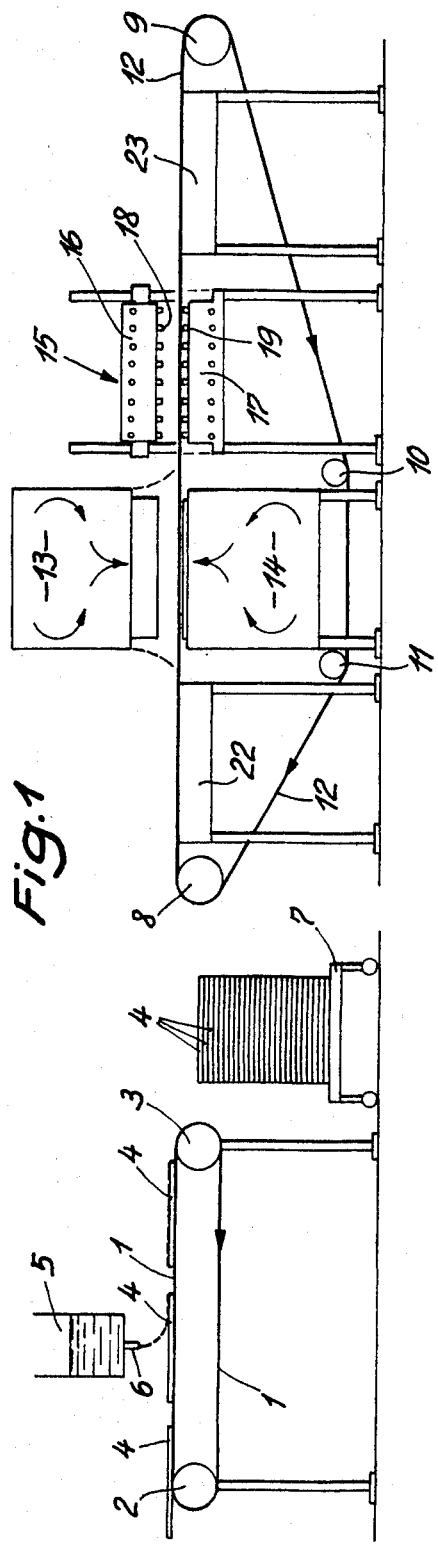
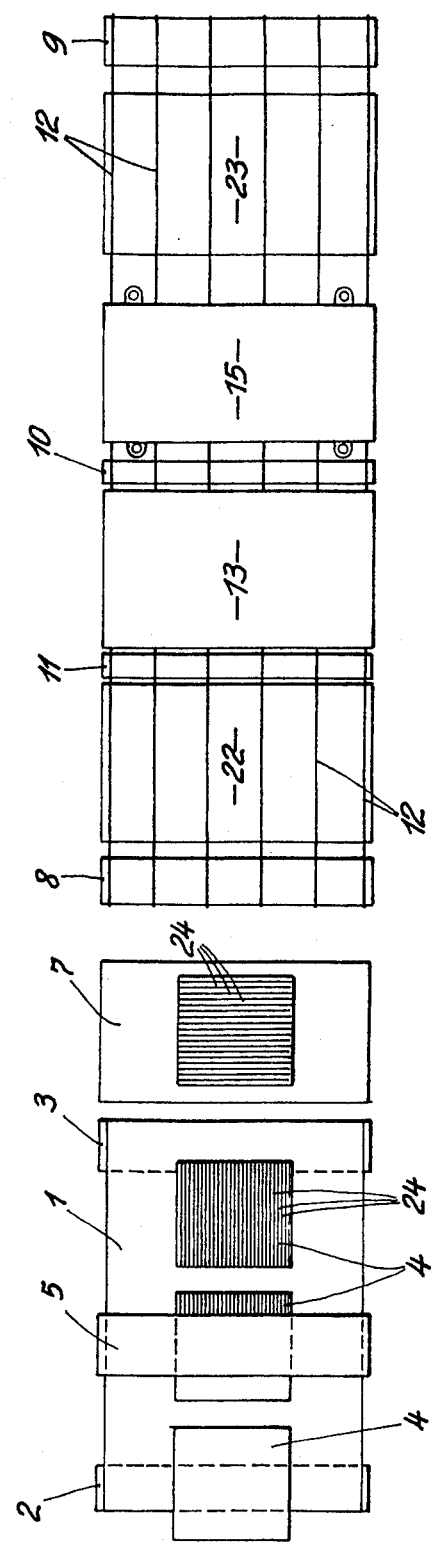

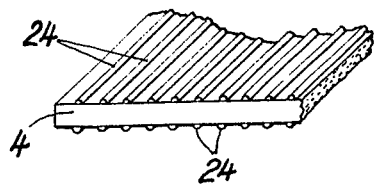
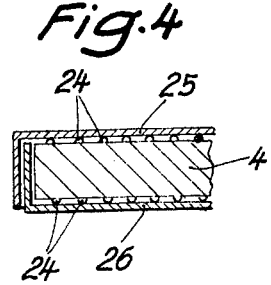
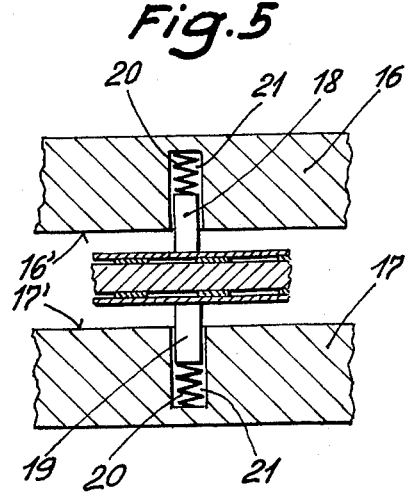
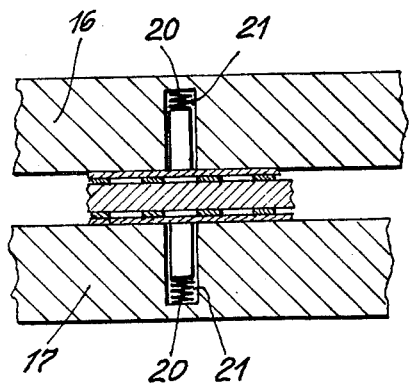
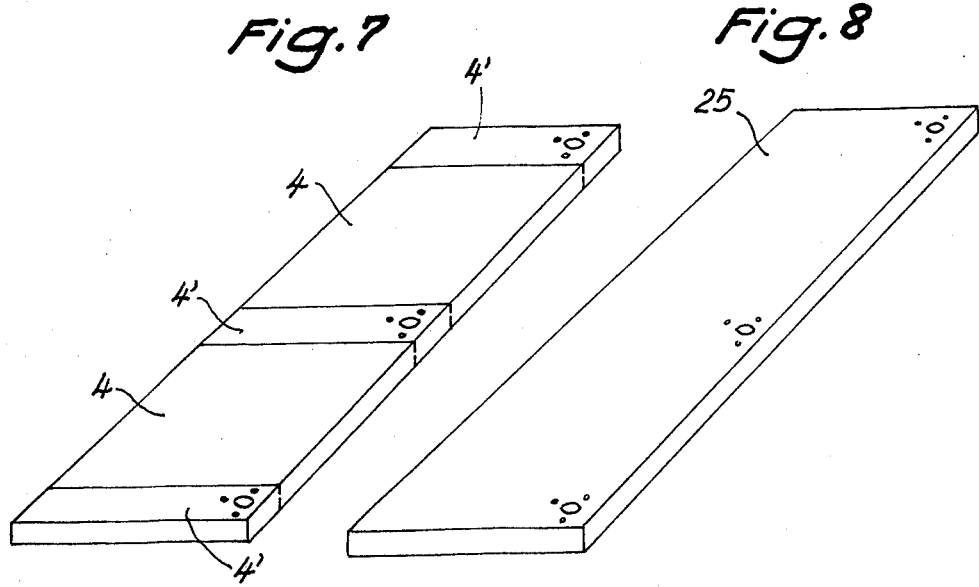

PROCESS AND APPARATUS FOR THE PRODUCTION OF LAMINATED SHEETS

BACKGROUND OF THE INVENTION

1. Field of the Invention

This invention relates to a process and apparatus for the production of sandwiched sheets with at least one sheet core of stable shape which is provided on both sides with firmly adhering covering sheets and which consists of a thermally insulating and sound-attenuating material, particularly for the production of doors, cupboards, chests and similar containers as well as of partition walls in buildings.

2. Description of the Prior Art

In a known process for the production of sandwiched sheets of this kind a loose mass of spherical grains of foam plastic is mixed with a liquid hardenable mass of binding agent for the surface moistening of the grains and then with powdered solids substance for covering the encasing layers of the grains, the resulting loose mass of spherical and doubly encased grains of foam plastic being moulded in a compression mould, in which it undergoes pressing force and the binding agent is hardened, to form a hollow cellular structure with combined and hardened polyhedral cell walls, each cellular chamber containing the material of one of the original grains of foam plastic.

This process suffers from the drawback that the production of the sandwiched sheets involves the use of special compression moulds adapted to the different sheet thicknesses.

SUMMARY OF THE INVENTION

The purpose of the present invention is to remedy this drawback. For this purpose, according to the process covered by the invention, a fusion adhesive in the form of a beading or corrugation is applied to both sides of a prefabricated sheet core of stable shape and of porous thermally insulating and sound-attenuating material, the melting points of the said adhesive being below the conversion point of the material used for the sheet core, after which the said sheet core, provided with the covering sheets and together with these latter, is heated for a short time to the melting point of the fusion adhesive, moulded in the heated state and cooled during the moulding.

The process to which the invention relates enables whole sets of expensive compression moulds to be dispensed with and use to be made of insulating sheets freely available on the market and capable of being cut to any desired size, such as those generally known under the trade name of "STYROPOR."

The process to which the invention relates is carried out by means of an apparatus having an endless conveyor belt which serves to accommodate the sheet cores and which is provided with a driving device, and also having a heatable container which is situated above the conveyor belt and which contains the fusion adhesive and which is provided with nozzles open towards the conveyor belt and serving to deliver liquid fusion adhesive in the form of a beading or corrugation. The apparatus is also provided with a conveyor device with heat-resisting cables passing over pulleys and situated parallel to and at a certain distance from one another, the upper sides of the cables passing between heating elements for upper and lower heat, these heating elements being followed, as viewed in the transport direction of the cables, by a press of which the pressure plates, made of a material of good thermal conductivity, are provided with a cooling device.

BRIEF DESCRIPTION OF THE DRAWINGS

FIG. 1 is a schematic diagram of the apparatus, in elevation;

FIG. 2 is a plan view of the apparatus shown in FIG. 1;

FIG. 3 shows a sheet core with beadings of fusion adhesive applied on both sides;

FIG. 4 shows a sheet core with covering sheets placed thereon;

FIGS. 5 and 6 are two detailed diagrams of a press with individual parts shown in two different positions;

FIG. 7 is a diagram, in perspective, of a special version of a sheet core with the lower covering sheet; and FIG. 8 shows the relevant upper covering sheet, likewise shown in perspective.

DESCRIPTION OF THE PREFERRED EMBODIMENTS

In FIGS. 1 and 2 the item marked 1 is an endless conveyor belt which passes over pulleys 2 and 3 and which serves to accommodate porous sheet cores 4 made of a thermally insulating and sound-attenuating material, e.g. of the inflated plastic granulate known under the trade nambe of "STYROPOR." These sheet cores can be cut to the desired size in each individual case from prefabricated sheets of the kind normally available commercially. The item marked 5 is a heatable container for an infusion adhesive and is provided with a series of nozzles 6 open towards the upper side of the conveyor belt 1. A transportable stack carrier 7 is used to take the sheet cores 4 from the conveyor belt 1.

The transport device 1 to 3 is provided with a conveyor device having thermally resistant cables 12 which pass over pulleys 8 to 11 and which are situated parallel to one another at distances apart of 20 cm, for example. The upper sides of these cables pass between two heating elements for the upper heat and the lower heat. In the example shown the heating elements consist of two hot air stoves 13 and 14. These hot air stoves are followed, as viewed in the transport direction of the cables 12, by a press 15. This press has two flat water cooled pressure plates 16 and 17 in which clamping bars 18 and 19, which face towards the upper sides of the cables 12, are spring mounted so that they are resilient in the direction of pressure, in such a way that when the pressure plates 16 and 17 (FIG. 5) are in the position of rest and said bars extend beyond the pressure surfaces 16' and 17' of the said pressure plates, while during the pressing process the said bars can return to their guide bed 21 under the effect of the springs 20. While the pressure plates 16 and 17 are made of a material of good thermal conductivity, such as copper or aluminium, the clamping bars 18 and 19 are made of a material of poor thermal conductivity. The number of clamping bars 18 and 19 and the distances between them are preferably the same as in the case of the nozzles 6 of the container 5 for the adhesive. The item marked 22 is a feed table associated with the conveyor device and serving for the sandwiched sheets not yet pressed, while that marked 23 is a delivery table for the sandwiched sheets on which the pressing process has been completed.

For the production of the sandwiched sheets the heatable container 5 is fed with a fusion adhesive of which the melting point is below the conversion point or softening temperature of the material used for the sheet cores 4. If the sheet cores 4 are made of "STYROPOR," for instance, then the fusion adhesive used will have a melting point of about 110° C. This fusion adhesive is applied to the sheet cores 4, through the nozzles 6 and with the conveyor belt 1 running, in the form of comparatively thick strips 24 (FIG. 3) of beaded or corrugated conformation. The comparatively cold sheet cores rapidly extract heat from the fusion adhesive applied, so that when a sheet core has reached the pulley 3 the adhesive beadings 24 have already set. If necessary the sheet cores may be subjected to a current of cooling air in order to ensure particularly rapid setting of the beadings of the fusion adhesive applied. The sheet cores to which strips of adhesive have been applied on one side, can now be turned over and conveyed past the bottom of the conveyor 5 once more, with their rear side facing towards the nozzle 6, after which the sheet cores provided with beadings of fusion adhesive on both sides are removed from the conveyor belt 1 and placed one upon the other on the stack carrier 7.

The sheet cores provided with the solidified beadings of adhesive can now be provided, as shown in FIG. 4, with the covering sheets 25 and 26 and placed on the feed table 22 and then transferred from there to the upper sides of the conveyor cables 12, preferably in such a way that the adhesive beadings take the same direction as the clamping bars 18 and 19, i.e. the direction transversal to the transport movement of the upper sides of the cables 12. The sheet cores provided with a covering sheet are now moved by the conveyor cables 12, in an intermittent movement and step-by-step, between the hot air stoves 13 and 14 heated to about 140° C, remaining in this position for a short time, during which the beadings of adhesive will soften. The hot air stoves 13 and 14 are operatively connected with a thermostat (not shown in the drawing) which regulates the temperature of the hot air in such a way that it will at all times remain below the conversion point of the sheet cores 4.

In a further phase of the movement of the conveyor pulleys 12 the sheet cores provided with a covering sheet enter the press 15, in which they again remain stationary for a short time and undergo the pressing process. This pressing process is carried out in two stages, in such a way that in the first stage only the spring mounted clamping bars 18 and 19 come in contact with the sheet 4, 25, 26, present in the press, in which process the covering sheets 25 and 26 are gently pressed onto the sheet core 4 by the clamping bars 18 and 19, the adhesive beadings 24 thus being crushed.

In the immediately subsequent second phase the flat water cooled pressure plates 16 and 17 now likewise come in contact with the covering sheets, in which process heat is extracted from them and the fusion adhesive sets before it is fully absorbed by the porous sheet core, the covering sheets and the sheet core undergoing complete bonding at this stage. In a further movement of the conveyor cables 12 the completely pressed sandwiched sheets reach the delivery table 23, from which they can be taken for further use.

The time taken by the sheets to pass from the feed table 22 to the delivery table 23 is shown by experience to amount to about two minutes.

In the variant shown in FIGS. 7 and 8 the sheet core 4 is provided at certain points with inserted bodies 4' of considerable strength and made, for example, of foamed polystyrol or polyurethane. These inserted bodies serve to reinforce door hinges, door locks etc.

As already mentioned, the sheet cores may advantageously consist of sheets made of inflated plastic granulate (STYROPOR) or of foamed plastic compound (POLYURETHANE). It is also possible, however, to make the sheet cores of other materials, such as sheets of corrugated cardboard produced on the sandwich principle.

I claim:

1. A process for the production of sandwiched sheets with at least one sheet core of stable shape which is provided on both sides with firmly adhering covering sheets and which consists of a thermally insulating and sound-attenuating material, particularly for the production of doors, cupboards, chests and similar containers as well as of partition walls in buildings, in which both sides of said sheet core are formed of foam plastic and a fusion adhesive is applied to both sides of said sheet core the melting point of said adhesive being below the conversion point of said foam plastic, after which the said sheet core is provided with said covering sheets, and together with these latter, is heated for a short time to the melting point of the fusion adhesive, moulded in the heated state and cooled during the moulding.

2. A sandwiched sheet when produced by the process in claim 1.

3. A sandwiched sheet in accordance with claim 2, in which the sheet cores are provided at certain points with inserted bodies of considerable strength.

4. An apparatus for the production of sandwiched sheets with at least one sheet core of stable shape which is provided on both sides with firmly adhering covering sheets and which consists of a thermally insulating and sound-attenuating material, particularly for the production of doors, cupboards, chests and similar containers as well as of partition walls in buildings, comprising a first conveyor device having an endless conveyor belt which serves to accommodate said sheet cores means adjacent said endless conveyor belt for providing fusion adhesive to the plate cores a second conveyor device provided downstream of said first conveyor device and comprising heat-resisting cables passing over pulleys and situated parallel to and at a certain distance from one another, the upper sides of the cables passing between heating elements, for upper and lower heat, a press provided downstream of said heating elements and comprising pressure plates made of a material of good thermal conductivity a cooling device, and a plurality of clamping bars formed of a material having a low heat conductivity and being mounted in said press to be resilient in the direction of operation of said pressure plates.

5. An apparatus in accordance with claim 4, wherein upstream of said heating elements a feed table is provided for the sheets cores provided with the covering sheets.

6. An apparatus in accordance with claim 4, wherein downstream of said press a delivery table is provided for the sandwiched sheets pressed and cooled.

7. An apparatus in accordance with claim 4, in which a thermostat is provided by which the temperature of the heating elements is regulated in such a way that it at all times remains below the conversion point of said foam plastic.

8. An apparatus in accordance with claim 4, in which said means for providing fusion adhesive comprises a heatable container provided with a plurality of nozzles open towards said endless conveyor belt and the number of clamping bars provided in said press and the distances between said clamping bars correspond to the number and spacing of said nozzles of said heatable container.

9. An apparatus in accordance with claim 15, in which the clamping bars are mounted in the press so as to project beyond the pressure surfaces of the pressure plates, under the action of springs, means are provided to enable the press to carry out a two-stage pressing operation, in which in a first stage of the two-stage pressing operation said covering sheets are only subjected to the spring loaded clamping bars, at least approximately in the zone of the adhesive beadings situated between the covering sheets and the sheet core, and in a second stage of the two-stage pressing operation said covering sheets are subjected to the action of said pressure plates, this latter operation being accompanied by the simultaneous cooling of said covering sheets and solidification of said fusion adhesive.

* * * * *